(12) United States Patent
Aslandere et al.

(10) Patent No.: US 11,935,280 B2
(45) Date of Patent: Mar. 19, 2024

(54) TRACKING SYSTEM AND METHOD EMPLOYING AN ARTIFICIAL NEURAL NETWORK FOR TRACKING TOOLS IN AND NEARBY A TRANSPORTATION VEHICLE

(71) Applicant: Ford Global Technologies, LLC, Dearborn, MI (US)

(72) Inventors: Turgay Isik Aslandere, Nordrhein-Westfalen (DE); Marcel Grein, Geilenkirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 17/649,290

(22) Filed: Jan. 28, 2022

(65) Prior Publication Data

US 2022/0245929 A1     Aug. 4, 2022

(30) Foreign Application Priority Data

Jan. 29, 2021   (EP) .................................... 21154248

(51) Int. Cl.
*G06V 10/80*     (2022.01)
*G06T 7/70*      (2017.01)
(Continued)

(52) U.S. Cl.
CPC .............. *G06V 10/809* (2022.01); *G06T 7/70* (2017.01); *G06V 20/59* (2022.01); *H04W 4/025* (2013.01); *H04W 4/38* (2018.02); *H04W 4/80* (2018.02)

(58) Field of Classification Search
CPC ...... G06V 10/809; G06V 20/59; G06V 10/80; G06V 10/82; G06T 7/70; H04W 4/38; H04W 4/02; H04W 4/80; H04W 4/025
See application file for complete search history.

(56) References Cited

U.S. PATENT DOCUMENTS

2007/0171431 A1    7/2007   Laflamme
2014/0358740 A1   12/2014   Lipsey et al.
(Continued)

FOREIGN PATENT DOCUMENTS

DE      102017205306 A1    10/2018
EP          1783570 A1      5/2007
(Continued)

OTHER PUBLICATIONS

EPO Search Report dated May 26, 2021.

*Primary Examiner* — Tuan H Nguyen
(74) *Attorney, Agent, or Firm* — Brandon Hicks; Eversheds Sutherland (US) LLP

(57) ABSTRACT

A tracking system and method for tracking tools in and nearby a transportation vehicle is provided. The tracking system comprises a vehicle-based detection unit for optically acquiring tool sets in the vehicle loading space from different angles and providing digital image data as well as corresponding range information. An electronic main controller unit is operatively coupled to a communication receiving unit and communicates with the vehicle-based detection unit and a cloud-based computer system of the tracking system. A mobile computing unit includes an optical camera and a LIDAR sensor device and wirelessly communicates with the electronic main controller unit and the cloud-based computer system. The tool detection and tracking is accomplished by combining an image-based detection employing an artificial neural network in the cloud-based computer system and a signal-based detection employing the short-range wireless network communication means.

8 Claims, 5 Drawing Sheets

(51) Int. Cl.
*G06V 20/59* (2022.01)
*H04W 4/02* (2018.01)
*H04W 4/38* (2018.01)
*H04W 4/80* (2018.01)

(56) References Cited

U.S. PATENT DOCUMENTS

| | | |
|---|---|---|
| 2015/0179036 A1 | 6/2015 | Heine et al. |
| 2018/0127006 A1 | 5/2018 | Wade |
| 2018/0322376 A1 | 11/2018 | Henry et al. |
| 2020/0310399 A1 | 10/2020 | Qi et al. |
| 2021/0138964 A1* | 5/2021 | Weller ................. B60R 7/04 |
| 2021/0264931 A1* | 8/2021 | Leider ................. G10L 15/26 |

FOREIGN PATENT DOCUMENTS

| | | |
|---|---|---|
| EP | 2916189 A1 | 9/2015 |
| EP | 2974831 A2 | 1/2016 |
| GB | 2583102 A | 10/2020 |
| WO | 2011038018 A1 | 3/2011 |
| WO | 2020183345 A1 | 9/2020 |

\* cited by examiner

TRACKING SYSTEM AND METHOD EMPLOYING AN ARTIFICIAL NEURAL NETWORK FOR TRACKING TOOLS IN AND NEARBY A TRANSPORTATION VEHICLE

CROSS-REFERENCE TO RELATED APPLICATIONS

The applications claims priority to and the benefit of European Application No. 21154248.5, filed Jan. 29, 2021, which is hereby incorporated by reference herein in its entirety.

FIELD

The invention relates to a tracking system for tracking tools in and nearby a transportation vehicle. The invention further relates to a method of tracking tools in and nearby a transportation vehicle using such tracking system.

BACKGROUND

Usually, professional craftsmen who are supposed to work for a customer or on a construction site to complete an order travel to the different locations with a transportation van that contains potentially required tools and other auxiliary equipment. In order to accomplish a high-efficiency workflow it is essential to properly keep good order to maintain availability of such items. Further, expensive tools should not be left unintentionally at the site to avoid expenses for replacement.

In the prior art, various solutions of methods and systems for tracking of items such as tools are known.

For instance, US 2014/0015672 A1 proposes a device and system for electronically tracking one or more objects such as tools or equipment. The object locator system comprises a transmitter device and one or more receiver tags. The transmitter device includes an electronic control circuit for producing control signals and has a panel display for viewing a list of objects to be tracked. The one or more receiver tags comprise an electronic circuit for receiving the control signals from the transmitter device, and for transmitting a response signal to the transmitter device. Each one of the receiver tags is attachable to an object from the list. The transmitter device provides a visual or audible signal representing the presence or absence of the objects of the list relative to a predetermined distance from the transmitter device.

From U.S. Pat. No. 9,939,693 B1 an asset tracking and work tool identification system is known. One or more work tools may be operably coupled to a work machine, such as backhoes, skid steers, dozers, front-end loaders, excavators, track type machines, on-road trucks, off-road trucks, motor graders or industrial mining equipment, in order to complete a specific task or operation. The tracking system for a work tool comprises a tracking device that is coupled to the work tool and is configured to transmit a work tool identification signal, and a wireless communication device that is configured to scan and detect the work tool identification signal within a work area. A location identification module such as a GPS receiver is coupled to the wireless communication device and is configured to receive the work tool identification signal, and to generate a work tool location signal, including a location indicator and a unique work tool identifier. A communication module is coupled to the wireless communication device and is configured to add a date and time stamp to the work tool location signal and to transmit the work tool location signal to an asset location control center. At least one accelerometer is coupled to the tracking device, the accelerometer activating the tracking device when the work tool is picked up by a work machine such that the tracking device communicates with a machine control module located on the work machine. A controller is located in the asset location control center and is configured to receive the work tool location signal with the date and time stamp.

The controller is programmed to save the work tool location signal with the date and time stamp into an asset location database such that the asset location database displays a last known location of the work tool.

US 2014/0062699 A1 proposes a system and a method for tracking usage of items such as consumables, tools and tool components at a work site. The method comprises: receiving, with a sensor in a mobile electronic device, data identifying a type of item stored in a container and a number of the type of item present in the container from a tag associated with the container; generating, with a user interface in the mobile electronic device, a prompt identifying the type of item and requesting entry of a count of the type of item for removal from the container; receiving, from the user interface, the count of the type of item; and storing in the tag, with the sensor in the mobile electronic device, a revised number of the type of item present in the container, the revised number being identified with reference to the count received from the user interface and the number of the type of item present in the container received from the tag. Moreover, US 2015/0070191 A1 describes a system and method for automatically tracking the presence or absence of multiple assets such as tools and vehicles within a stationary or mobile location. The automated asset tracking system comprises at least one active RF tag, at least one transponder antenna, a transponder base, at least one server and a human readable device. The at least one active RF tag is affixed to an asset to be tracked. The at least one transponder antenna is at a known location and is in wireless communication with the at least one active RF tag for receiving data from the at least one RF tag. The at least one transponder antenna has a CPU comprising means for filtering out redundant tag beacon data prior to such data being sent to a transponder base. The transponder base is remotely located from and in electronic communication with the at least one transponder antenna, wherein the transponder base comprises means for accurately determining the presence or absence of a tag within a defined physical space. The transponder base further comprises means for selectively wirelessly transmitting data to the Internet via electronic connection, selected from the group consisting of WiFi, cellular, and Ethernet. The at least one server comprises means to collect data from the Internet, analyze the data, and transmit the data in preselected format. The human readable device is configured for wirelessly collecting data from the server, and displaying the data in a predetermined format.

From US 2015/0179036 A1 a system and method for tracking items such as consumable items and tools stored in a compartment is known. The system for tracking locations of items comprises a plurality of items, each item being configured to be stored and removed from a compartment, and a plurality of tags affixed to the plurality of items in a one-to-one correspondence to uniquely identify each item in the plurality of items with an identifier stored in each tag.

The system further includes a tag reading device, a sensor, an output device and a processor. The tag reading device is associated with the compartment and is configured to receive data from each tag in the plurality of tags in response to each removal from and each return to the compartment of each item in the plurality of items. The sensor is configured to identify a state change of the compartment. The processor is communicatively coupled to the tag reading device, the sensor, and the output device, and is configured to identify removal of one item in the plurality of items from the compartment with reference to the identifier stored in the tag begin received by the tag reading device. The processor is further configured to identify the state change in the compartment with the sensor after identification of the removal of the one item and without identifying that the one item has been returned to the compartment, and to generate an output with the output device that includes the identifier corresponding to the one item in response to the identification of the state change in the compartment.

WO 2017/197409 A1 proposes a solution for a personal safety and tool loss prevention system and method for persons working at a location remote from a home location. The system comprises a server, a portable tracking device and at least one tracking tag. The server has the ability to store information relating to a vehicle, to a person associated with that vehicle and to tools and equipment associated with that vehicle. The portable tracking device is adapted to be carried or worn by the person when leaving the vehicle. The at least one tracking tag is adapted to be mounted on a tool or equipment used by the person at locations remote from the vehicle. The portable tracking device includes a communication device adapted to connect the tracking device to the server and a receiving device adapted to receive signals from the or each tracking tag. The tracking tag includes a transmitting device adapted to communicate with the tracking device while the tracking tag is within a limited distance of that tracking device. The communication device is adapted to send a signal to the server indicative of whether or not the receiving device of that tracking device is in communication with the tracking tag. The server is adapted to provide an indication when it detects that the tracking tag is not in communication with the tracking device.

Another field of application for item tracking is monitoring of quantities of stock and/or assets, for instance in a storage environment with hand-portable stock items.

For example, in US 2018/322376 A1 an asset tag that is adapted to be mounted to an asset such as tools is described. The asset tag comprises a first component encoded with a first ID unique to the asset tag. The first component has a first wireless interface and is adapted to transmit first broadcast signals via the first wireless interface over a first range. The first broadcast signals include the first ID. The asset tag further includes a user-actuatable button and processing circuitry, which is coupled to the button and to at least the first wireless interface. The processing circuitry is configured for (i) determining whether a predetermined gesture has been performed by a user using the button and (ii) if the predetermined gesture has been performed, transmitting via the first wireless interface to a wireless access point a restock message, the restock message including the first ID and indicating that restocking is required of assets corresponding to the first ID.

Tracking of tools is also known in the field of medical treatment, where it may be required to match surgical tools that were located and/or used during a specific event.

By way of example, US 2016/0212577 A1 describes a computerized system to track and monitor a tag paired to a tool such as a surgical instrument, item or disposable. The system comprises a signal receiving unit, a central server comprising a tag database and a tag processing unit, and a monitoring station. The signal receiving unit is configured to obtain a location of a tag. The tag database is configured to store a data record of the tag, wherein the data record comprises information about the tag. The tag processing unit is configured to update the data record stored in the tag database. The monitoring station is configured to obtain a flag event related to the tag, wherein the flag event includes an indication that the tool paired to the tag was present in a location of a detected event, and further to transmit the flag event to the central server.

In view of the prior art, the field of tracking of tools, in particular of tools used by professional craftsmen who work at a customer site or on a construction site, still offers room for improvement.

With conventional tracking systems, tracking of tools by radio frequency signals of employed tags mounted to tools or tool containers, respectively, may be compromised by obstruction of the radio frequency signals, for instance by mutual obstruction from metal parts of tools, or by obstruction from transportation vehicle doors, or from consumable material such as metal plates or the like.

SUMMARY

It is therefore an object of the invention to provide a system and method for tracking tools in a transportation vehicle, in particular of tools used by professional craftsmen who are supposed to work at a customer or on a construction site, with improved performance capability regarding tracking of tools in the presence of other metal-comprising tools, and during a handling of the tools in the vicinity of metal parts of the transportation vehicle.

In one aspect of the invention, the object is achieved by a tracking system with the features of claim 1 for tracking tools in and nearby a transportation vehicle. The object is further achieved by a method of tracking tools with the features of claim 9. Further, particularly advantageous embodiments of the invention are disclosed in the respective dependent claims.

It should be noted that the features and measures listed individually in the following description can be combined with one another in any technically meaningful manner and show further embodiments of the invention. The description additionally characterizes and specifies the invention in particular in connection with the figures.

In one aspect of the invention, a tracking system for tracking tools in and nearby a transportation vehicle is provided. The tracking system includes a plurality of tool sets that is arrangeable in a loading space of the vehicle at least during transportation, wherein each tool set includes a tool and at least one fixedly attached short-range wireless network communication member, and a short-range wireless network communication receiving unit that is arrangeable in the vehicle loading space and that is configured to receive signals transmitted by and unique to each short-range wireless network communication member.

It is proposed that the tracking system further includes a vehicle-based detection unit, an electronic main controller unit, a mobile computing unit and a cloud-based computer system.

The vehicle-based detection unit has detection means that are each arrangeable for optically acquiring at least a portion of the plurality of tool sets at least in the vehicle loading space from different angles, wherein the detection means are configured for providing digital image data as well as corresponding range information.

The electronic main controller unit is operatively coupled at least to the wireless network communication receiving unit, includes communication means for communicating with the vehicle-based detection unit, and is operatively coupable to communication means for communicating with a cloud-based computer system.

The mobile computing unit includes an optical camera, a LIDAR sensor device and communication means for wirelessly communicating with the electronic main controller unit and the cloud-based computer system.

The cloud-based computer system comprises at least one trained artificial neural network that at least serves as a basis for providing a prediction output regarding identity and location of tool sets of the plurality of tool sets, based on digital image data and corresponding range information provided by the vehicle-based detection unit.

In the sense of the present invention, the term "plurality" shall in particular be understood as a quantity of at least two. In the sense of the present invention, the phrase "being configured to", shall in particular be understood as being specifically programmed, laid out, furnished or arranged.

In one aspect, the proposed tracking system can avoid a compromising of tool detection and tracking by potential obstruction of the radio frequency signals, for instance by mutual obstruction from metal parts of tools, or by obstruction from transportation vehicle doors, or from consumable material such as metal plates or the like, so that at least a reduction of a number of false detection results can be accomplished.

It is further an insight of the present invention that by combining an image-based detection by the vehicle-based detection unit with an RF signal-based detection a high-precision tracking system with a high confidence level of detection for tools in and nearby a transportation vehicle can be provided, and a reliable detection and tracking of objects, i.e. tools, can be achieved.

Without being limited to, the mobile computing unit may be designed as a mobile phone, a tablet computer or a wearable device.

The proposed tracking system is primarily designed for land vehicles. However, it is also conceived within the scope of the present invention to employ the tracking system in commercial shipping vessels for tracking items such as containers, or in a cargo aircraft transporting various kinds of loads.

In the sense of the present invention the term "tool" is meant to have a general meaning, and shall include tools with plug and cordless tools such as fastening tools, saws, hammer drills, chargeable screwdrivers, hammers, but also equipment items and other objects such as portable batteries. Further it should be noted, that although in particular tools used by professional craftsmen who are supposed to work at a customer or on a construction site are describe in the above and the following, it is to be understood, that the invention could also be used for the parcel delivery sector or in passenger vehicle sector for item tracking like the sports bag or the jacket of a user, without being limited to these examples.

In preferred embodiments of the tracking system, the detection means of the vehicle-based detection unit include a plurality of optical cameras and a LIDAR sensor device, wherein each optical camera and the LIDAR sensor device are arrangeable in the vehicle loading space such that a respective field of view comprises at least a portion of the loading space of the vehicle. In this way, an effective and cost-saving solution for optically acquiring at least a portion of the plurality of tool sets at least in the vehicle loading space from different angles for providing digital image data as well as corresponding range information can be attained.

LIDAR (light detection and ranging) sensor devices as devices for measuring distances (ranging) by illuminating an object with laser light and measuring the reflection with a sensor are well known in the art, for instance in applications such as autonomous driving, and need not be described in more detail herein. Further, LIDAR sensor devices are readily commercially available. In particular, the LIDAR sensor device may comprise a flash LIDAR sensor.

In preferred embodiments, the tracking system further comprises an image processing unit that is operatively coupled to the vehicle-based detection unit and to the mobile computing unit. The image processing unit is configured for calibrating and rectifying sets of digital image data and their corresponding range information, and for creating merged data sets, wherein each merged data set comprising calibrated and rectified sets of digital image data and their corresponding range information.

In this way, calibration and rectification of images from separate sensors can be achieved for common further processing. The calibration here may refer to matching a resolution of the sensors to each other by interpolation and removing noise data as they might have different resolutions and frame rates. Rectification is a well-known procedure, which can be applied to multiple cameras, and is described for instance in the article by M. Pollefeys, R. Koch and L. Van Gool, "*A simple and efficient rectification method for general motion*", Proceedings of the Seventh IEEE International Conference on Computer Vision, Kerkyra, Greece, 1999, pp. 496-501 vol. 1, doi: 10.1109/ICCV.1999.791262.

At a low-complex level of calibration and rectification, camera images and the depth image (from LIDAR) may simply be merged, and one single image with RBG and depth information may be created.

In preferred embodiments, the image processing unit and the vehicle-based detection unit may be contained in a common housing, which can enable a fast signal processing with minimal interference. In other embodiments, however, the image processing unit and the vehicle-based detection unit may have separate housings for providing a larger freedom of arrangement.

Preferably, at least one of the detection means of the vehicle-based detection unit and the optical camera of the mobile computing unit is configured for operating at visible light wavelengths as well as at near-infrared wavelengths. In this way, tracking of tools even at low lighting conditions can be enabled, which can beneficially be used to prevent and/or deter theft.

In preferred embodiments of the tracking system, the short-range wireless network communication members are designed as Bluetooth beacons, and the signal transmitted by each short-range wireless network communication member comprises a unique identifier. In this way, a cost-effective and well-proven solution for wireless identification and location of the plurality of tool sets can be provided.

Algorithms for detecting nearby Bluetooth devices based on determining respective signal strengths are available in the art and are described, for instance, in the article by Devanshi, Devanshi & Agrawal, Sunil & Singh, Sarvjit, (2014), "*Indoor Localization based on Bluetooth Technology: A Brief Review*", International Journal of Computer Applications, 97, 31-33, 10.5120/17029-7327, and in the article by A. N. Raghavan, H. Ananthapadmanaban, M. S. Sivamurugan and B. Ravindran, "*Accurate mobile robot localization in indoor environments using bluetooth*", 2010 IEEE International Conference on Robotics and Automation, Anchorage, A K, 2010, pp. 4391-4396, doi: 10.1109/ROBOT.2010.5509232.

The BLE (Bluetooth Low Energy) radio standard is also very energy-efficient. The Bluetooth beacons can have their own battery, however, they might also use the battery of the tool that they are attached to. They may be charged, for instance, by employing USB ports. In other embodiments they may be also be charged inductively using a wireless power transfer technology.

In preferred embodiments of the tracking system, the mobile computing unit includes a display unit that is configured for visualizing tracked tool sets and their respective location. This can allow for a craftsman to check at a glance a status of the plurality of tool sets with regard to being present in the loading space of the vehicle or not.

In preferred embodiments of the tracking system, the electronic main controller unit includes a data interface that is connectable to a vehicle-internal data communications interface, wherein the electronic main controller unit is configured to receive vehicle-related data via the data interface. For instance, the vehicle-related data may include various information such as speed and/or GPS (Global Positioning System) coordinates of the vehicle. This information can be especially useful when a tracking of an object, i.e. a tool set, is unsuccessful, so that the last recorded GPS coordinates and a time information can readily be provided to any user.

Preferably, the vehicle-internal data communications interface is designed as a CAN (Controller Area Network) bus interface. However, interfaces based on any other vehicle bus protocol that appear suitable to those skilled in the art may be employed.

In preferred embodiments of the tracking system, the at least one trained artificial neural network comprises at least one deep neural network (DNN).

An artificial neural network comprises a plurality of interconnected artificial neurons (also called nodes) and has an input side and an output side. Each artificial neuron of the plurality of interconnected artificial neurons can transmit a signal to another artificial neuron connected to it. The received signal can further be processed and transmitted to the next artificial neuron.

The output of each artificial neuron may be calculated using a non-linear function of the sum of its inputs. During a learning process, weights of the non-linear function are usually being adjusted, resulting in a trained artificial neural network, for which a set of weights for the artificial neurons has been determined such that an output signal of the artificial neural network is close to a desired output signal.

A DNN is an artificial neural network with multiple hidden layers of artificial neurons between the input side and the output side. DNNs are known to be able to model complex non-linear relationships, and are beneficially employable in the proposed tool tracking system for an image-based detection by the vehicle-based detection unit.

In another aspect of the present invention, a method of tracking tools in and nearby a transportation vehicle is provided, which uses an embodiment of the tracking system disclosed herein. The method comprises steps that are usually preceding a tracking mode operation of the tracking system. These steps are
  a preceding step of training the at least one artificial neural network of the cloud-based computer system using digital image data and corresponding range information provided by the mobile computing unit, and
  a preceding step of communicating the weights of the at least one trained artificial neural network to the electronic main controller unit of tracking system.

For improved performance of the tracking system, another step of training may also be executed in a break of the tracking mode operation. The deep learning algorithm that predicts the output is also executable by the electronic main controller unit.

During a tracking mode operation of the tracking system, the following steps are to be carried out periodically:
  by activating the vehicle-based detection unit, providing digital image data and corresponding range information regarding the vehicle loading space,
  providing a prediction output regarding identity and location of tool sets of the plurality of tool sets, based on the provided digital image data and corresponding range information and the trained artificial neural network,
  receiving signals transmitted by each short-range wireless network communication member with the short-range wireless network communication receiving unit,
  performing a tracking and localization algorithm on the received signals to obtain an estimate for locations of identified tool sets of the plurality of tool sets, and
  applying a recursive estimator algorithm for deriving a refined result for locations of identified tool sets of the plurality of tool sets, using the prediction output derived on the basis of the trained artificial neural network and the estimate for locations of identified tool sets as input data.

The benefits described beforehand in context with the tracking system apply to the proposed method in accordance with the invention of tracking tools in and nearby a transportation vehicle to the full extent. It is in the sense of the invention, that it could not only be applied to transportation vehicles but could also be applied to other transportation/logistic modes like planes, trains, or containers in harbors, without being limited to these examples.

In preferred embodiments of the method, the preceding step of training of the at least one artificial neural network further comprises using signals, provided by the mobile computing unit, that have been transmitted by and that are unique to each short-range wireless network communication member. In this way, the identification is implemented in the training of the at least one artificial neural network right from the beginning and does not have to be incorporated at a later point in time to become an integral part of the tracking procedure.

Preferably, the method further comprises a step of visualizing the refined result for locations of identified tool sets of the plurality of tool sets on a display unit of the mobile computing unit, which can allow for a craftsman to check at a glance a status of the plurality of tool sets with regard to being present in the loading space of the vehicle or not.

In preferred embodiments, the method further includes a step of storing the derived refined results for locations of identified tool sets of the plurality of tool sets in the cloud-based computer system. In this way, the cloud-based computer system can serve as an access point for involved and authorized parties to obtain a list of the tracked tools in the vehicle.

BRIEF DESCRIPTION OF THE DRAWINGS

These and other aspects of the invention will be apparent from and elucidated with reference to the embodiment or the embodiments and attached drawings described hereinafter, wherein.

DETAILED DESCRIPTION

Figure 1:
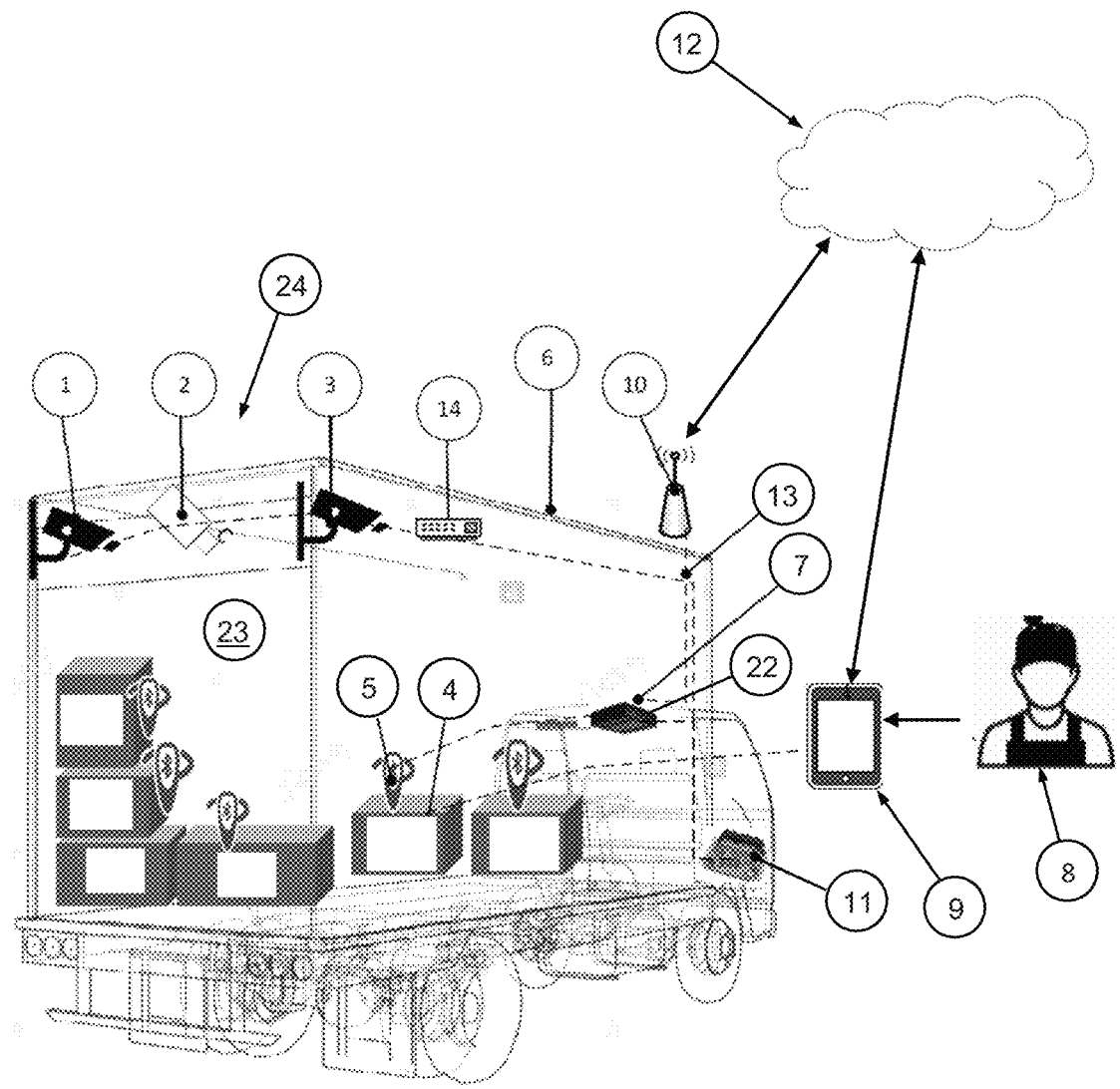
FIG. 1 schematically shows a tracking system in accordance with the invention for tracking tools in and nearby a transportation vehicle in a perspective, elevated side view in an installed state.
Figure 2:
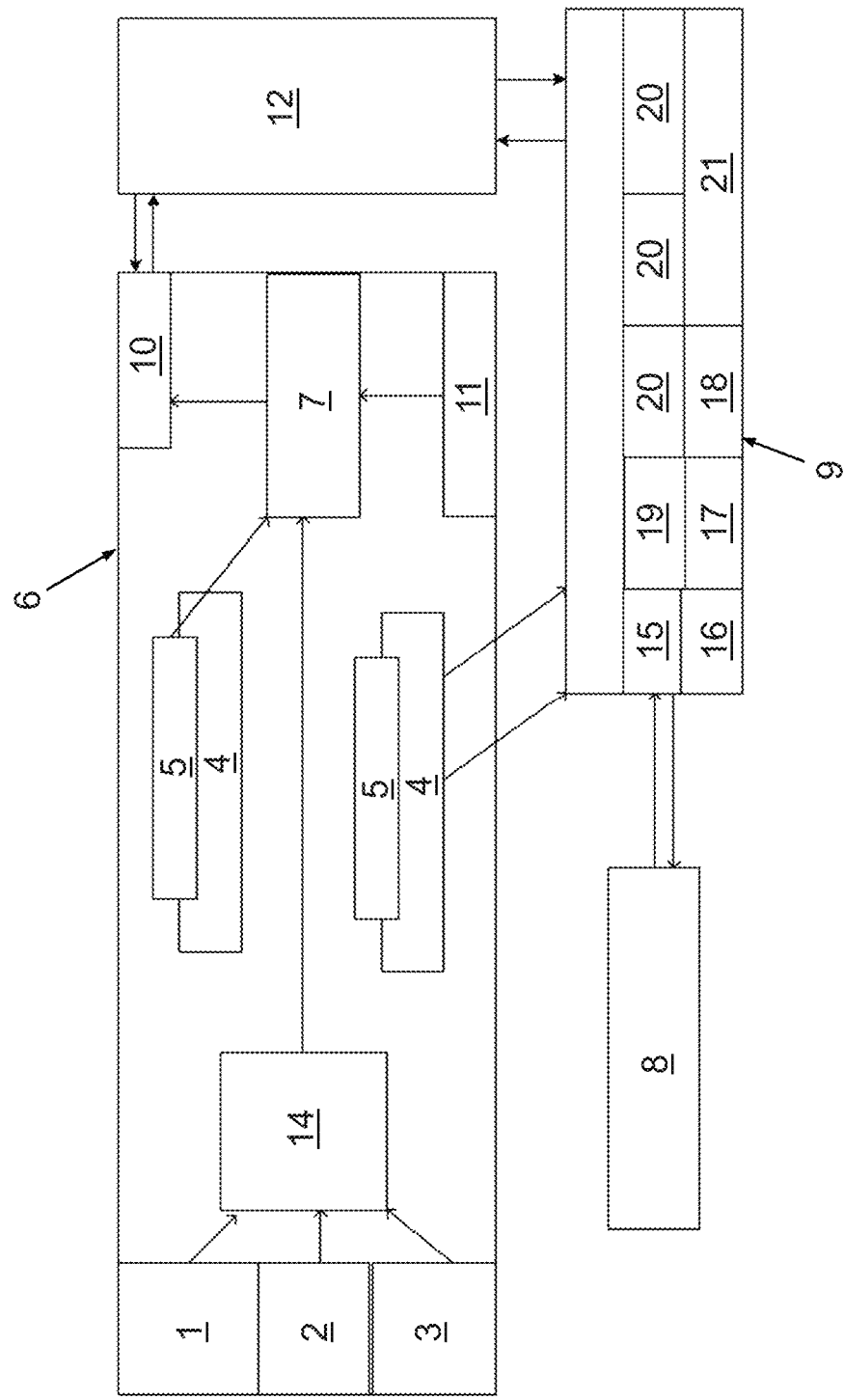
FIG. 2 shows an overview block diagram of the tracking system pursuant to FIG. 1, FIG. 3 an activity block diagram of the tracking system pursuant to FIG. 1.

FIG. 1 schematically shows a tracking system in accordance with the invention for tracking tools in and nearby a transportation vehicle in a perspective, elevated side view in an installed state. FIG. 2 shows an overview block diagram of the tracking system pursuant to FIG. 1.

With the exception of some of its components the tracking system is installed in the loading space 23 of a transportation vehicle 6 that is designed as a truck.

The tracking system comprises a plurality of tool sets 4 that are arranged in the vehicle loading space 23 during transportation and in times of non-use during working hours of craftsmen on a construction site. Each tool set 4 includes a tool, a tool case for storing the tool and a fixedly attached short-range wireless network communication member 5 that is designed as a Bluetooth beacon.

The Bluetooth beacons 5 may have their own electric power source such as a battery, but they may also be powered using a battery of the tool set 4 they are fixedly attached to, employing appropriate electrical connections.

A short-range wireless network communication receiving unit 22 of the tracking system is configured to receive signals transmitted by and unique to each short-range wireless network communication member 5. For achieving uniqueness, the signal transmitted by each short-range wireless network communication member 5 comprises a unique identifier. The short-range wireless network communication receiving unit 22 forms an integral part of an electronic main controller unit 7 of the tracking system. The electronic main controller unit 7 is arranged in the vehicle loading space 23.

The electronic main controller unit 7 is designed as a computer device, which includes processor units with random access memory, digital data storage units and communication hardware (not shown). The electronic main controller unit 7 is operatively coupled to the short-range wireless network communication receiving unit 22. The communication hardware of the electronic main controller unit 7 may comprise a CAN controller that is connected to the vehicle-internal data communications interface designed as a CAN interface 11, for receiving vehicle-related data such as vehicle speed and coordinates from a GPS (global positioning system) installed in the vehicle 6.

The tracking system further includes a vehicle-based detection unit 24 having various detection means. The detection means comprise a plurality of two optical cameras 1, 3 and a LIDAR sensor device 2. The optical cameras 1, 3 may be designed as RGB cameras having a light source including near infrared light, such that the optical cameras 1, 3 are configured for operating at visible light wavelengths as well as at near-infrared wavelengths. The LIDAR sensor device 2 may comprise a flash LIDAR sensor with a low-energy laser light emitter and low energy consumption.

The two optical cameras 1, 3 and the LIDAR sensor device 2 are arranged close to a roof at the top of the vehicle loading space 23 such that a respective field of view comprises a portion of the vehicle loading space 23. In this way, the detection means of the vehicle-based detection unit 24 are arranged for optically acquiring the plurality of tool sets 4 from different angles and are configured for providing digital image data as well as corresponding range information.

The tracking system further comprises a mobile computing unit 9. The mobile computing unit 9 may be designed as a tablet computer, a smartphone or a wearable device, which are configured for interactive operation with a user 8, usually a craftsman. The mobile computing unit 9 includes an optical camera 15 and a LIDAR sensor device 16, processor units 17 such as a central processing unit (CPU), a global processing unit (GPU) and an artificial intelligence (AI) processing unit, random access memory (RAM) 18, a digital data storage unit 19 and wireless communication means 20 such as LTE, Bluetooth and WiFi at least for communicating with the electronic main controller unit 7. As usual, the mobile computing unit 9 includes a display unit. In this specific application, the display unit is in particular configured for visualizing tracked tool sets 4 and their respective location, for instance by an installed application software.

Furthermore, the tracking system comprises a cloud-based computer system 12, which comprises at least one artificial neural network, which in turn includes at least one trainable deep neural network. The cloud-based computer system 12 provides high-performance computing services including high computational power and storage capacity. As will be further described, the deep neural network at least serves as a basis for providing a prediction output regarding identity and location of tool sets 4 of the plurality of tool sets 4, based on digital image data and corresponding range information provided by the vehicle-based detection unit 24.

The wireless communication means 20 of the mobile computing unit 9 are configured for communicating with the cloud-based computer system 12. The electronic main controller unit 7 is operatively coupled to communication means for also communicating with the cloud-based computer system 12. To this end, wireless communication means of the electronic main controller unit 7 are connected to a vehicle-based modem 10 that is configured, among others, for wireless communication with the cloud-based computer system 12.

In FIG. 1 the various wireless communication paths are generally denoted by reference numeral 13 and are characterized by dashed lines.

The tracking system includes an image processing unit 14 that may form an integral part of the vehicle-based detection unit 24. In this specific embodiment, the image processing unit 14 is designed as a separate entity for achieving larger freedom of arrangement. The image processing unit 14 is operatively coupled to the vehicle-based detection unit 24 and to the mobile computing unit 9. The image processing unit 14 is configured for calibrating and rectifying sets of digital image data and their corresponding range information, and for creating merged data sets. Each merged data set comprises calibrated and rectified sets of digital image data and their corresponding range information.

The electronic main controller unit 7 includes communication means for wirelessly communicating with the image processing unit 14 and, thus, indirectly with the vehicle-based detection unit 24, to receive the created merged data sets.

Figure 4:
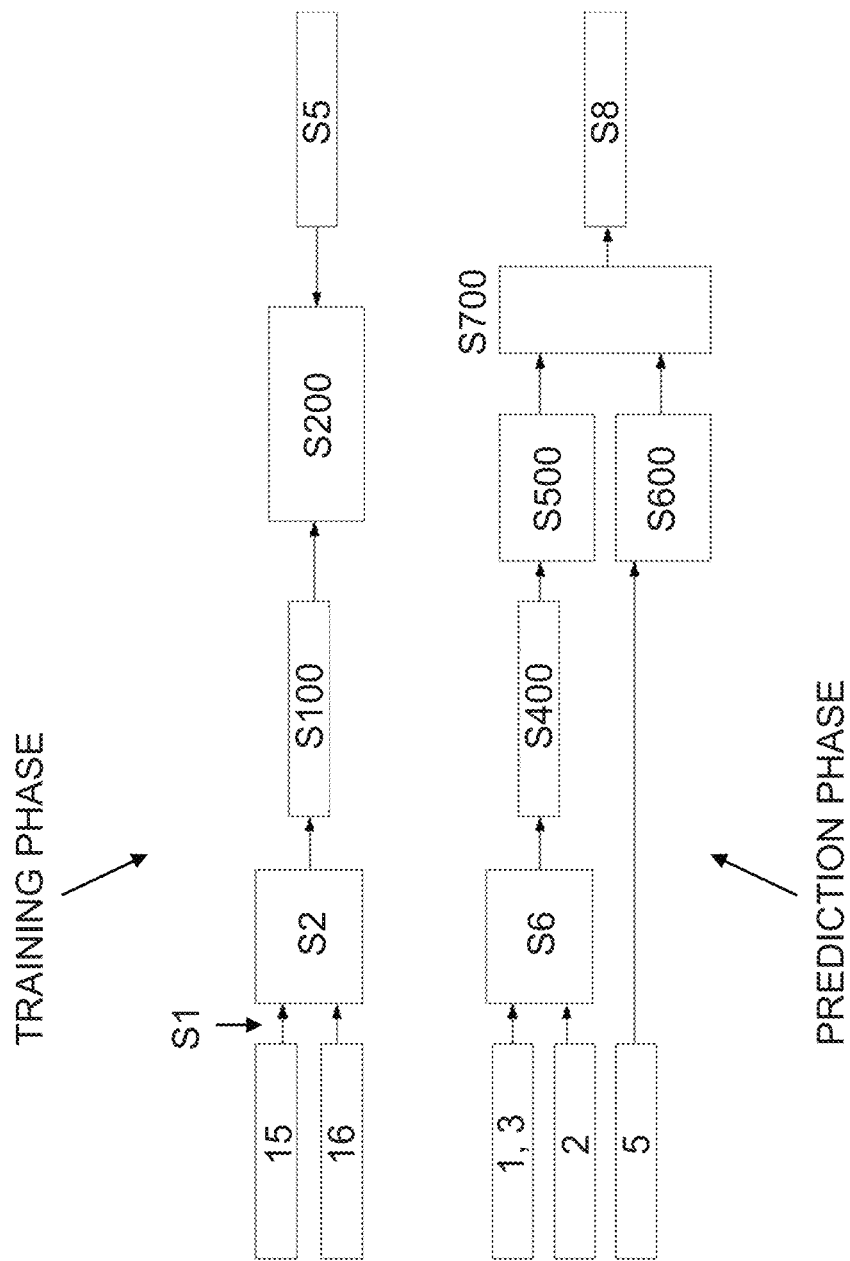
FIG. 4 shows an overview block diagram of a method in accordance with the invention of tracking tools in and nearby a transportation vehicle using the tracking system pursuant to FIG. 1, and FIG. 5 a high-level flow chart of the method in accordance with the invention during training phase and tracking mode operation (prediction phase) using the tracking system pursuant to FIG. 1, In the different figures, parts that are the same are always denoted by the same reference numeral, for which reason they are usually described only once.
Figure 5:
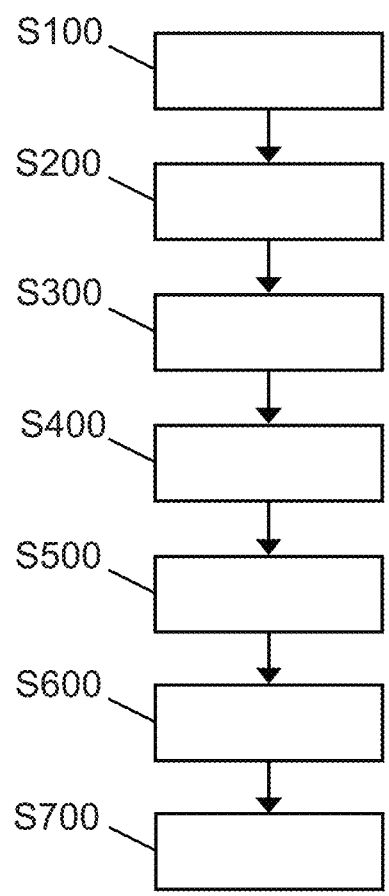

In the following, a possible embodiment of a method of tracking tools in and nearby the transportation vehicle 6 using the tracking system pursuant to FIG. 1 will be described with reference to FIGS. 3 to 5.

Figure 3:
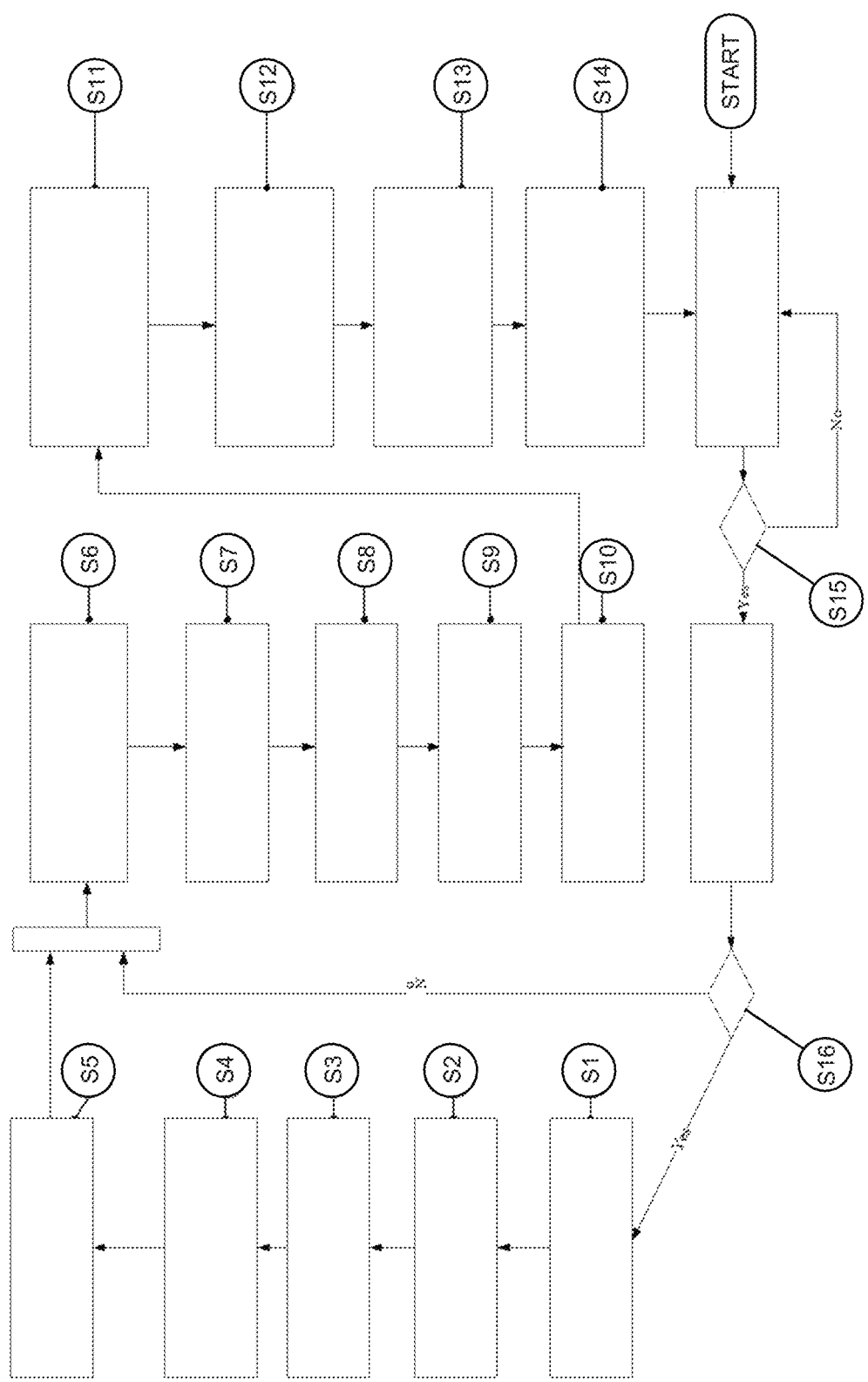

FIG. 3 shows an activity block diagram of the tracking system pursuant to FIG. 1. FIG. 4 shows an overview block diagram of the possible embodiment of the method in accordance with the invention. A high-level flow chart of the method in accordance with the invention during training phase and tracking mode operation (prediction phase) of the tracking system pursuant to FIG. 1 is provided in FIG. 5. In preparation of operating the tracking system, it shall be understood that all involved units and devices are in an operational state.

An execution of the method commences upon fulfillment of predefined conditions, checked in a step S15, which may relate to a start of the vehicle 6, a vehicle door being opened and/or the mobile computing unit 9 being active.

Prior to enabling tracking mode operation of the tracking system, it is checked in a query step S16 if a new tool is to be tracked in the vehicle loading space 23. If this is not the case, tracking mode operation of the tracking system is started.

Otherwise a training phase is carried out for training the artificial neural network. To this end, a user 8 of the tracking system, usually a craftsman, activates the optical camera and the Lidar sensor device of the mobile computing unit 9 for providing digital image data and corresponding range information of the new tool to be tracked in a step S1. The step S1 further includes adding to the data the unique identifier transmitted by the Bluetooth beacon 5 that is fixedly attached to the tool set 4 of the new tool to be tracked. The Bluetooth beacon 5 may have been directly received by Bluetooth communication means forming part of the mobile computing unit 9, or it may have been directly received by the electronic main controller unit 7 and transferred from the electronic main controller unit 7 to the mobile computing unit 9 via the existing wireless communication means.

In another step S2, the user 8 activates the mobile computing unit 9 to upload the digital image data, the corresponding range information from the LIDAR sensor device and the unique identifier to the cloud-based computer system 12.

In another step S100, the cloud-based computer system 12 executes a procedure for calibrating and rectifying the set of digital image data and their corresponding range information to create a merged data set, and uses the merged data set for training the artificial neural network in another step S3, S200.

The applied training procedure, i.e. the deep learning algorithm, may depend on the application and may include YOLO (You Only Look Once) or Residual Neural Networks. The training procedure trains a pre-trained artificial neural network (e.g. ResNet-50, inception V3) using the captured digital image data and corresponding range information as the label data. The use of the pre-trained artificial neural network is known in literature as transfer learning.

At the end of the training procedure a set of weights obtained from the learning of the artificial neural network is wirelessly communicated to the electronic main controller unit 7 in another step S4, S300. For this purpose, the cloud-based computer system 12 gets connected to the vehicle-based modem 10.

In another step S5, the electronic main controller unit 7 registers the unique identifier of the tool set 4 to be tracked and an identifier of the corresponding digital image to the artificial intelligence algorithm. This completes the training phase for the new tool set 4 to be tracked.

When the tracking mode operation of the tracking system is enabled, the vehicle-based detection unit 24 and the image processing unit 14 are activated in another step S6 for providing digital image data and corresponding range information regarding the vehicle loading space 23.

The same procedure of calibrating and rectifying sets of digital image data and their corresponding range information, and for creating merged data sets is performed by the image processing unit 14 as in the training phase in a step S400. A prediction output regarding identity and location of tool sets 4 of the plurality of tool sets 4 is provided in a step S500, based on the provided digital image data and corresponding range information and the trained artificial neural network.

Another step S600 includes receiving signals transmitted by each short-range wireless network communication member 5 with the short-range wireless network communication receiving unit 22 and executing a tracking and localization algorithm on the received signals to obtain an estimate for locations of identified tool sets 4 of the plurality of tool sets 4.

In a next step S700, a recursive estimator algorithm, which may be designed as a Kalman filter, is applied to the prediction output derived on the basis of the trained artificial neural network and the obtained estimate for locations of identified tool sets 4 as input data for deriving a refined result for locations of identified tool sets 4 of the plurality of tool sets 4. Further, the electronic main controller unit 7 receives and updates the information on the plurality of tool sets 4 and combines it with the data received via the CAN communication interface in another step S7.

In a next step S8, the electronic main controller unit 7 sends the refined result for locations of identified tool sets 4 with the combined vehicle-related data to the cloud-based computer system 12.

In a next step S9, the derived refined results are stored in the cloud-based computer system 12.

In a next step S10, the mobile computing unit 9 gets connected to the cloud-based computer system 12 and retrieves the derived refined results for locations of identified tool sets 4 of the plurality of tool sets 4. This step also comprises visualizing the refined result for locations of identified tool sets 4 of the plurality of tool sets 4 on the display unit of the mobile computing unit 9 to make the information available to the user 8, usually a craftsman.

In a next step S11, the electronic main controller unit 7 checks a charging status of battery 21 and a power consumption of the tracking system to adapt a frequency of the periodically executed tracking steps. If necessary, a low battery status notification may be sent to the mobile computing unit 9.

In a next step S12, if it is detected that wireless communication to the cloud-based computer system 12 is not available and a state-of-charge of the battery 21 falls below a predefined threshold value, the mobile computing unit 9 gets connected to the electronic main controller unit 7 and makes the tracked tool set 4 and the corresponding localization information available to the user 8.

In a next step S13, if the electronic main controller unit 7 detects from the vehicle-internal data communications interface that the vehicle doors are closed or the vehicle 6 is not running, it transfers the tracking system from the tracking mode operation into idle mode operation (sleep mode) in order to safe electric power.

In a next step S14, if the electronic main controller unit 7 detects from the vehicle-internal data communications interface that any one of the vehicle doors is opened or the vehicle 6 is started, it transfers the tracking system from idle mode operation to tracking mode operation.

While the invention has been illustrated and described in detail in the drawings and foregoing description, such illustration and description are to be considered illustrative or exemplary and not restrictive. The invention is not limited to the disclosed embodiments.

LIST OF REFERENCE SYMBOLS 1 optical camera
2 LIDAR sensor device
3 optical camera
4 tool set
5 short-range wireless network communication member (Bluetooth beacon)
6 vehicle
7 electronic main controller unit
8 user (craftsman)
9 mobile computing unit
10 modem
11 CAN interface
12 cloud-based computer system
13 wireless connection
14 image processing unit
15 optical camera
16 LIDAR sensor device
17 processor units
18 random access memory
19 digital data storage unit
20 communication means
21 battery
22 short-range wireless network communication receiving unit
23 vehicle loading space
24 vehicle-based detection unit
S1 activate optical camera and LIDAR sensor device of mobile computing unit
S2 upload data to cloud-based computer system
S3 use merged data sets to train artificial neural network
S4 communicate and implement set of weights obtained from training to main controller unit
S5 register unique identifier of new tool to AI algorithm
S6 activate detection means of vehicle-based detection unit
S7 main controller unit to receive and update information on tool sets and combine with vehicle-related data
S8 main controller unit to send refined results to cloud-based computer system
S9 store refined results in cloud-based computer system
S10 (mobile computing unit) to retrieve refined results and display to user
S11 check battery status
S12 mobile computing unit connect to main controller unit for retrieving tool set locations
S13 transfer tracking system into idle mode operation
S14 transfer tracking system into tracking mode operation
S15 check conditions for commencing method execution
S16 query step for new tool
S100 calibrate and rectify data from mobile computing unit to create merged data set
S200 use merged data sets to train artificial neural network
S300 communicate and implement set of weights obtained from training to main controller unit
S400 calibrate and rectify data from vehicle-based detection unit to create merged data set
S500 provide prediction output regarding identity and location of tool sets based on trained artificial neural network
S600 execute tracking and localization algorithm for estimating identified tool set locations
S700 apply recursive estimator algorithm (Kalman filter) to prediction output from artificial neural network and location estimate obtained from Bluetooth beacons

The invention claimed is:

1. A tracking system for tracking tools in and nearby a transportation vehicle, the system including:
a plurality of tool sets that is arrangeable in a vehicle loading space of the transportation vehicle at least during transportation, wherein each tool set includes a tool and at least one fixedly attached short-range wireless network communication member;
a short-range wireless network communication receiving unit that is arrangeable in the vehicle loading space and that is configured to receive signals transmitted by and unique to each short-range wireless network communication member;
a vehicle-based detection unit having one or more optical cameras and a LIDAR sensor device that are each separate from the tool sets and arrangeable in the vehicle loading space for optically acquiring at least a portion of the vehicle loading space and at least a portion of the plurality of tool sets at least in the vehicle loading space from different angles, wherein the one or more optical cameras and the LIDAR sensor device are configured for providing digital image data as well as corresponding range information for the at least a portion of the plurality of tool sets;
an electronic main controller unit, which is operatively coupled at least to the wireless network communication receiving unit, which is configured to communicate with the vehicle-based detection unit, and which is configured to communicate with a cloud-based computer system;
a mobile computing unit including an optical camera, a LIDAR sensor device, and configured to wirelessly communicate with the electronic main controller unit and a cloud-based computer system; and
the cloud-based computer system comprising at least one trained artificial neural network that at least serves as a basis for providing a prediction output regarding identity and location of tool sets of the plurality of tool sets, based on digital image data and corresponding range information provided by the vehicle-based detection unit.

2. The tracking system as claimed in claim 1, wherein each of the optical cameras and the LIDAR sensor device of the vehicle-based detection unit are arrangeable in the vehicle loading space such that a respective field of view comprises at least a portion of the vehicle loading space.

3. The tracking system as claimed in claim 1, further comprising an image processing unit that is operatively coupled to the vehicle-based detection unit and to the mobile computing unit, and that is configured for calibrating and rectifying sets of digital image data and their corresponding range information, and for creating merged data sets, each merged data set comprising calibrated and rectified sets of digital image data and their corresponding range information.

4. The tracking system as claimed in claim 1, wherein at least one of the one or more optical cameras and a LIDAR sensor device of the vehicle-based detection unit and the optical camera of the mobile computing unit is configured for operating at visible light wavelengths as well as at near-infrared wavelengths.

5. The tracking system as claimed in claim 1, wherein the short-range wireless network communication members are designed as Bluetooth beacons, and the signal transmitted by each short-range wireless network communication member comprises a unique identifier.

6. The tracking system as claimed in claim 1, wherein the mobile computing unit includes a display unit that is configured for visualizing tracked tool sets and their respective location.

7. The tracking system as claimed in claim 1, wherein the electronic main controller unit includes a data interface that is connectable to a vehicle-internal data communications interface, and wherein the electronic main controller unit is configured to receive vehicle-related data via the data communications interface.

8. The tracking system as claimed in claim 1, wherein the at least one trained artificial neural network comprises at least one deep neural network.

* * * * *